W. M. STORM.
SELF CONDENSING GAS ENGINE.
No. 13,598. Patented Sept. 25, 1855.
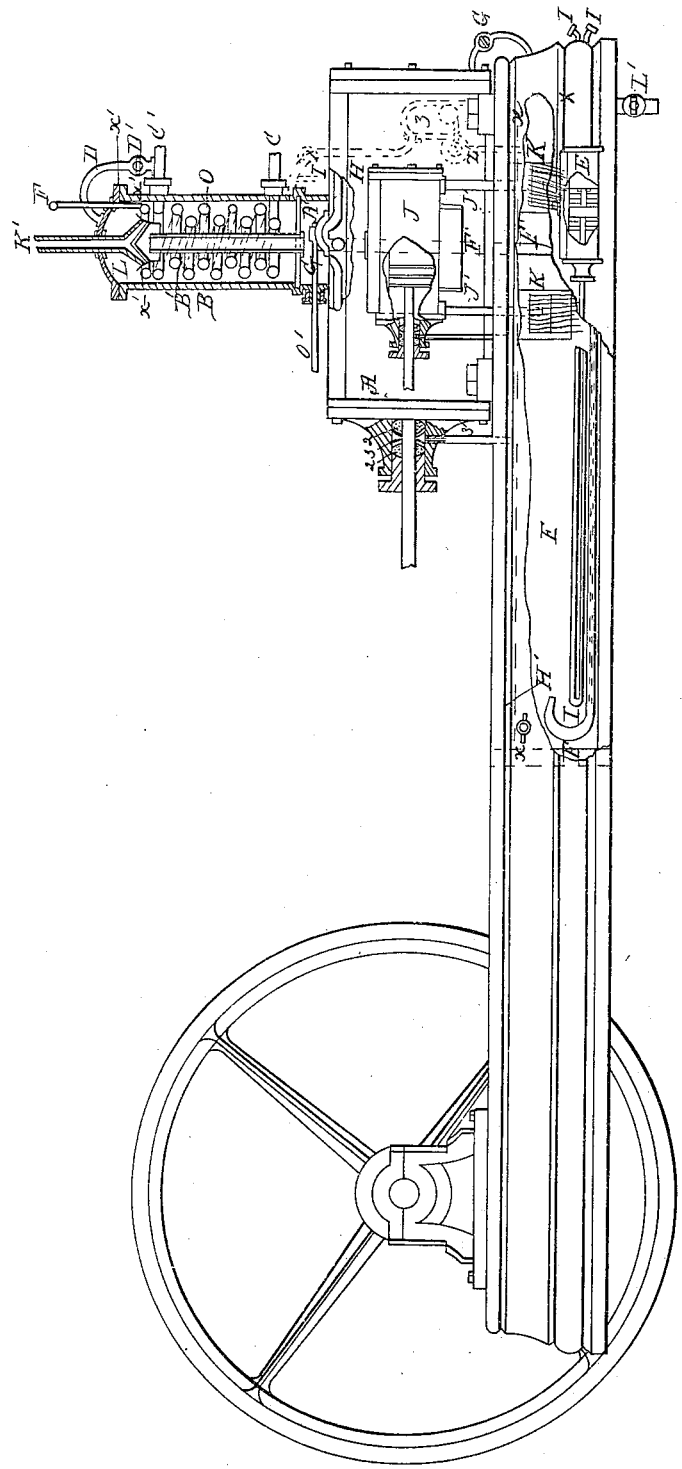
Inventor.
Wm. M. Storm.

UNITED STATES PATENT OFFICE.

WILLIAM MT. STORM, OF NEW YORK, N. Y.

IMPROVED METHOD OF ACTUATING GAS-ENGINES.

Specification forming Letters Patent No. 13,598, dated September 25, 1855.

*To all whom it may concern:*

Be it known that I, WILLIAM MT. STORM, of the city, county, and State of New York, have invented a novel and useful Method of Obtaining Motive Power, the principle of which consists in taking advantage of and rendering available to that end that peculiar phenomenon in nature by which water has the power to absorb and will promptly absorb without the aid of artificial means a very large amount of certain gases, such as carbonic acid or ammonia, (amidide of hydrogen,) especially the latter, which, moreover, from its permanently-elastic character under ordinary atmospheric temperatures and pressures, its tremendous expansion by heat (as compared with common air, for instance) when humid, as after having been set free from water which has held it absorbed, and from its preservative instead of injurious effect upon the metals, offers every advantage as a motive agent. Water will absorb this gas to an amount exceeding five hundred fold its own volume at the average temperature and pressure of the atmosphere, and more as the pressure is made greater, (which is readily managed by compressing an atmosphere of increased density of the gas itself over water;) and I would here remark that it is economy so to do, as the temperature necessary to cause the release of the gas is but little greater, and the increased quantity of caloric required is insignificant, while the mean tension through a given grade of expansion is increased enormously, this reduction of the gas by absorption being equivalent in mechanical result to the compression of so much air by means of a force-pump to a density affording a pressure of hundreds of pounds per square inch, and which, when released, would of course afford a very great power; but while it would require to effect this compression by mechanical means an outlay of power precisely equal, even omitting friction, &c., to that yielded by its re-expansion, nothing would be gained in the way of spare motive power. On the contrary, however, by employing, in lieu of the force-pump, water, possessing, as it does, this peculiar property of absorbing so powerfully this particular gas, (ammonia,) and employing it composed of nitrogen and hydrogen in lieu of common air, constituted of nitrogen and oxygen, as the medium to be so compressed, the compressing-power becomes self-aerated, and the immense power produced by its re-expansion (on being released from the water by the application of a little heat) is of course almost entire spare power. It may be set free from the water at any desirable or manageable pressure, high or low, and at temperatures within the very moderate limits of from 130° Fahrenheit to 400° Fahrenheit, according to the extremes of such pressure within practical limits. It may also be set free under such circumstances of temperature and pressure, wherever chosen, in as great or as limited quantities of operation peculiar to my method, and as may be desired, the latter by a plan described hereinafter. It does not, contrary to what would at first be inferred, absorb a quantity of caloric on its release from the water corresponding to the calculated "latent heat" of the gas, because a large portion of this latent heat is retained during and after absorption, and its reabsorption by the water does not for the same reason elevate the temperature of the latter to near the extent that the entire expulsion of its latent heat thereon could under the case, its presence in the water seeming to form, as it were, a compound liquid whose combined heat or specific or latent heat is greater than that of simple water.

This gas is plentiful in nature and cheap of production, being obtainable from the distillation of almost every organic substance. It is obtained in large quantities combined with water in the distillation of coal for illumination; and, in fact, wherever and whenever nitrogen and hydrogen, one or both being nascent, come in contact, they combine, even though mixed with other gases, in the proportion of fourteen of the former and three of the latter, forming this gas; and, in fact, the gas-charged water itself, under the name of "water of ammonia," is sold as a common article of commerce, ready in the most advantageous form for use in an engine as a motive agent on the plan here set forth. It is not costly, and is readily obtained in any quantity in this favorable form; and as the quantity required for "charging" and operating an engine by my plan is quite limited, and as the same is used over and over continuously, as hereinafter explained, even the "first cost" of its employment is comparatively trifling. Leakage, in fact, is the only point, if any, from which a drawback to its great convenience and economy can appear to arise, and I think effectual provision can be made against this single source of loss, as will be shown farther on. As to its chemical propriety as a general motive agent, neither the gas nor the water charged with it appears, in the very great number of experiments I have tried with it, to have any evil effect whatever on the metals, acting only on the oxides of some of them. With that of copper, for instance, it forms a blue pigment. Iron it seems rather to preserve from rust and tarnish. For these reasons I would employ iron solely in those parts of the engine and apparatus with which the gas is to come in contact. It does not injuriously affect leather, clothing, india-rubber—pure or vulcanized—used for packing joints, or even the skin; and the gas, in case of an accidental leakage, when mingled with the external air and breathed into the lungs, has no injurious effect.

An engine may be worked by means of this ammonia-charged water with or without a "cut-off" and with or without a vacuum, as well as the steam-engine, with the difference that my experience with it seems to prove that in no case is a condensing-jet necessary, the gas being easily cooled on its passage to the vessel constituting in effect the "condenser," and is promptly, almost instantly, absorbed by the water always kept present therein, this "condensation" by absorption being quite different from condensation depending entirely on refrigeration, as in the steam-engine.

This gas has long since attracted the interest of men of science, as involving the properties of an economical and desirable motive agent; but no method was developed of rendering it of easy and reliable practicability as an ordinary means of obtaining motive power.

The recorded methods essayed were confined to two, only one of which received actual practical trial. This was the plan of reducing the isolated gas to a liquid form by means of extreme pressure and cold (by refrigerating-mixtures) on one side of a piston, while on the other side, by means of gentle heat, a portion of the liquid gas was dispelled into vapor, impelling the piston correspondingly. The impracticability of this method to any useful end is evident. A temperature equal to that of the external atmosphere would alone cause a pressure too great to manage and to prevent leakage, and the difficulties of its recondensation would be even still greater. The other method mentioned as essayed, or rather suggested, was examined and abandoned as impracticable and useless without the evidence of actual practical trial being deemed necessary. This was to endeavor to employ water of ammonia and evaporate it as so much common water in a boiler, the expected advantage being because of its boiling at lower temperatures than common water and giving much higher pressures at like degrees of heat. The employment of it in this manner was found to be unfeasible, because the gas would rapidly leave the water and the boiling-point would rise correspondingly higher, so that at the commencement of the process the power produced would be almost entirely due to the gas set free, the force rapidly declining and becoming more and more, and soon entirely, dependent on the common steam from the water, and of course formed at a corresponding expense of time and heat; and no plan was foreseen or invented to avoid these difficulties. (See Dalton's Experiments, Tredgold, page 70.) Now, I overcome this difficulty by causing the gas to separate from the water (by heat) very rapidly (by the additional aid of agitation) and in a time and under a temperature and pressure that, jointly taken, are quite insufficient to convert the water meanwhile into steam, both the gas and the water being then immediately conducted through the apparatus, (and the former, at least, through the cylinder of the engine actuating its piston,) again to meet in a cool closed vessel, where they immediately recombine in the original form of water of ammonia as perfect and ready for reuse as at the beginning of the process.

It will thus be seen not only that the separation complained of by Dalton and others is made the greatest source of economy in the use of ammonia-water, as it removes the necessity and consequent expense of converting the simple water portion into steam, but it will also be seen that by taking proper advantage in this manner of the remarkable power of water to attract and absorb this gas it may be recollected and freely conveyed back in this concentrated form to the heating-vessel, to be again set free, and so used over and over continually. But still another great and necessary point is embraced in this outline of my process just set forth, which is that although the gas can be reconcentrated, &c., by water simply, yet it is only by bringing to meet and reabsorb the gas the same water which had previously in the process held it absorbed that a constant accumulation of either simple water in the heating or separating-vessel or a back-pressure of free gas (or else of extra water) in the cool receiver or absorbing-vessel can be avoided. This will be clear on a moment's reflection, and will explain one main purpose in the peculiar method of operation I adopt and have in a general way stated.

I remarked that on separation the gas at least passed through the cylinder, other things equal. I prefer that the water should pass to the cool receiver by a separate passage, and not through the cylinder, because as the expansion in the cylinder lowers the temperature of its contents reabsorption would to that extent tend to take place if both water and gas were therein present, and this would be adverse to the best motive effect. The difficulty may be nearly obviated, however, in one other way, which is to jacket the cylinder with hot water or steam to keep up the temperature despite of the expansion.

I have also remarked in an early part of this schedule that in my method I could set free the gas in as limited quantities during any given moment as I desired. This I effect by feeding the gas-charged water to the discharger or separator in "charges," keeping the separator nearly dry or free of more than a single charge of water at any given time. This plan of using the gas-charged water in charges is not only more consistent and accordant with the basing feature of my system, but avoids a great difficulty and drawback that would otherwise arise in any attempt to use gas-charged water as a motive agent by any process that could possibly be devised. It would be that if the heating-vessel or separator contained at any one time any considerable body of the gas-charged water, whenever the engine was stopped for a considerable time, as in the case of a boat at a landing or a locomotive at a depot, since the fire must continue, the fluid gas would rapidly accumulate in the heating-vessel and soon "blow off," causing a waste that could hardly be afforded. Of course, by feeding the heating-vessel in this manner by charges (thrown in by a pump working with the engine) and maintaining the heating-vessel nearly free at all times of gas-charged water, no more could be set free to raise the pressure to blowing off, despite the continuance of the fire when the engine was temporarily stopped; but then, again, from the very absence of water, it would not meantime be protected from the action of the fire, and would rapidly become highly heated and burned out and destroyed. I overcome this new difficulty by employing a medium, such as water, (contained in a strong "heater," of any convenient form in use,) upon which the fire acts, and this heated medium can be conveyed (by circulation, in the manner well known) to a distance through a pipe, to impart its heat in turn to the separator. Of course, with the heater the temperature can be perfectly controlled by the load on its "safety-valve."

Thus my system for rendering this gas-charged water practically available and convenient in all respects consists in the employment of two separate fluid media—one for taking up and conveying the gas and one for taking up and conveying the heat to a common meeting-point, (the separator,) where each shall act, without admixture, on the other, one parting with its gas, the other with its heat, the gas and the heat uniting and passing to the engine to actuate it, while each medium returns to the source whence it came, the one to receive and bring back another charge of heat, the other to receive and bring back another charge of gas, and so on continuously.

I will now proceed to describe a form of engine and apparatus which I have had in operation long since, and with perfect satisfaction, it being understood that the mere form of construction and arrangement may be varied to suit any circumstances.

Let A represent the cylinder of an engine in all respects similar to the steam-engine. Upon the top of its valve-chest A' is located the chamber or "separator" B, in which is a double coil, B', which communicates by the pipe C with a small water boiler or heater, or, more specifically, with the water-space or bottom of such heater, which is not shown on the drawing. The top end, C', of the coil, which I call the "flasher," communicates similarly with the steam-space of such heater.

It will be evident that if the bottom of the flasher or coil is something above the level of the water in the heater the coil will be filled with steam of a temperature corresponding to its pressure, and the coil will thereby be heated accordingly. This steam, on yielding heat through the coil to the gas-charged water, which is to be at each revolution of the engine thrown upon it, will in proportion be condensed and run down by its gravity back into the water-space of the boiler or heater. If, on the other hand, the height of the water in the heater is such as to fill the coil with water, rapid circulation will occur, keeping up uniformly the proper temperature and answer every requisite for small engines; but in large engines it is desirable that the coil should be filled with steam, (although not imperative,) because it is desirable to be able to "blow through" with steam and warm up the engine before starting—a thing which the gas does not readily effect, because (and therein lies one of its greatest sources of economy) it does not part with its latent heat like steam by contact with cold surfaces within temperatures at all approachable in practice, unless abundance of water is at the same time present, as before explained, and then of course the water takes up the moderate amount of heat set free, and not the engine. To blow through with steam, then, at starting— supposing steam to fill the coil—I have a branch pipe, D, with a stop-cock, D', which effects the purpose, as will be readily seen.

The bed-frame or shear of the engine may be cast hollow, so as to form an extended airtight chamber, E, accessible by means of "man-holes." A side view of the interior of this chamber is shown "broken off" on the drawing, so as to expose the interior and parts within. This chamber constitutes the "cold-receiver" or "absorbing" or "recombining" vessel, whichever it may most properly be termed, and may form a vessel or chamber distinct from the engine, if deemed more convenient, and would do so per necessity in the case of a steam-engine already built being altered to run by this method. This chamber should contain some gas-charged water, the level of which may be represented by the red line X X.

Now, suppose the flasher (coil) heated in the manner known. E' is a pump, whose length of stroke is made adjustable either by hand or, as I have devised, by the action of the "governor" of the engine, so that the quantity of gas-charged water it throws into the flasher (this being its purpose) shall be proportioned to the wants of and load on the engine for the moment, and this pump worked with and by the engine and so arranged and located that the gas-charged water from the receiver runs into it by its own gravity. As the piston moves on, while it is filling on one side of its piston it is forcing the gas-charged water from its opposite side over through the pipe F into the circle of perforated pipe $x'$ $x'$ within the separator, from which circle, which constitutes a "rose," it flies out in a shower of small jets over the hot coil or flasher, when the gas is flashed off from the water and creates a pressure in the separator, while the water falls to the bottom, out of contact with the coil, and forms a thin layer on the bottom of the separating-chamber, where it still gives off gas during the decrease of pressure in the separator for the moment caused by the withdrawal of the supply passing to the engine during the current stroke of its piston. This momentary discharge of gas from the charge of water, after its removal from the source of heat, depresses its temperature usefully, leaving less to be sacrificed in the cold-receiver, as all that it possesses above the temperature of the latter, on its final release from the separator, must be. As the engine finishes its stroke, or rather just prior to this, this charge of now decharged water descends through the pipe (shown in red dotted lines) to the chamber Z, (similarly shown,) to enable it to do which a like portion is allowed to descend from this chamber, by means of the pipe and cock $Z'$, (the latter opening and closing properly for this purpose,) to the cold-receiver. Thus an undue accumulation of decharged water in the separating-vessel is prevented. The gas meantime passes through the hollow column o, open at the top and not at the bottom, so that the gas may pass to the valve-chest of the engine, while the water cannot, and, passing through and actuating the engine, is allowed to escape or "exhaust" through the pipe $F'$ into the cold-receiver. This exhaust-pipe passes, as is seen, the length of the receiver or cold-chamber under the gas charged water, and is perforated with holes to permit the water to enter the pipe and the gas to escape from it into the water as it exhausts, each in small jets, by which means great surface of mutual contact between the water and gas is provided; and surface, I have found, has a powerful influence in causing a more quick and sudden absorption, and my experiments would appear also to show that it has a considerable influence even on the quantity absorbed.

Although the water is already charged, it will promptly absorb the further comparatively trifling addition it receives at the moment from the engine, because it is not of course charged to its absolute maximum under the given temperature and pressure, if any, in the receiver, and it is maintained at the same degree below this maximum by the corresponding arrival to it of the charge of decharged water from the separator. Thus an accumulation of free gas and a consequent back-pressure, (exceeding any chosen point,) retarding the engine, is prevented in the receiver, and as at the same time a corresponding quantity of charged water is withdrawn to be forced into the separator, any accumulation in the separator of water is prevented. The exhaust-pipe, at its end, rises clear of the water, so as to permit an unimpeded exit to the spray that is likely to be coming out each time with some momentum.

Operated in this manner the engine shows and maintains a good engineer's "vacuum" in the cold-receiver.

The air may be expelled by the steam used for blowing through, as in the ordinary steam-engine, by opening the petcock G, drawing the slide-valve $G'$ forward, so as to open the port H of the engine, the valve in the branch pipe D being open, when, as will be easily traced, the steam will drive any air that may have leaked in from the separator, valve-chest, port H, pipe and petcock G, and, last, from out of the receiver by the opening (at other times covered with an air-tight "bonnet") in the side of the receiver above the water. (This opening is $H'$.) All the cocks are now shut, the steam in the passages and receiver quickly condenses, and a vacuum is left in the latter.

I I represent the extremities of a "gridiron-coil," through which water, by a difference of temperature at the two extremes of the coil, amounting even to five or ten degrees, will circulate rapidly to and from a tank or other source, (not shown,) and, without admixture, take up the heat arriving with each charge of decharged water, conveying it away from the receiver, and keep the gas-charged water in it cool. It is very desirable that its temperature should not exceed 100° Fahrenheit, and as much less, down to about 40° Fahrenheit, as may be convenient.

To prevent leakage is, as before remarked, the only point demanding special care in the management of this engine.

To avoid any chance of leakage at the fixed points is, as a matter of course, perfectly easy, and the moving or working joints may be reduced to three—viz., cylinder stuffing-box, that of the air-pump, and that of the valve-rod $o'$.

A trifling leak is not of any moment, yet such a leak as is often neglected in the steam-engine could not properly be permitted here. To overcome this difficulty the stuffing-boxes should be made of extra length, so as to permit the employment of double "gaskets" 2 2, with a skeleton ring between, so as to maintain there a space extending entirely around the piston-rod, and as no oil need be used for the stuffing-boxes, the gas-charged water being a fine lubricating medium, the gaskets may be solid rings of vulcanized india-rubber in the form shown. This makes a frictionless perfectly tight and lasting joint both between the space 3 and the cylinder and between such space and the external air. Still, however, should there be from any neglect leakage by the greater pressure in the cylinder past 2′, the gas is caught in the recess 3, where it is free to expand on the instant to a low and therefore less insinuating pressure, while from the space 3 passes a small pipe, 3′, by which the gas that has worked through is led to the receiver, into which it would be drawn and absorbed by the water. This will cover all danger and loss from leakage when the engine is worked with a vacuum in the receiver; but when the engine is worked with a compressed atmosphere of gas in the receiver, as hereinbefore suggested and hereinafter described, the little pipe from the space 3 may lead to any small vessel containing water, or the space itself may be filled with water, and this will instantly absorb and so save any gas that may happen to pass by 2′. These means perfectly master the difficulty of loss by chance leakage.

Having now described the method of working my engine with a vacuum, I will describe the other method mentioned of working with an actual pressure in the receiver maintained by the same means below or above any chosen point—say one to three atmospheres—by which method I can attain greater force and economy than can be done even with the aid of the vacuum. To prepare the engine for so working, suppose the gas-charged water to be in the receiver, as before, and all air (which if left present would cause no particular inconvenience by this last method of working) to be expelled in the manner described. The flashing-coil being heated up, gas-charged water is injected upon it. The gas is set free therefrom and passes to the cold-receiver until there is a permanent excess pressure of gas over the water beyond the maximum it can absorb at the given pressure chosen. Every cubic inch of gas will now contain, say, about two thousand times its bulk of gas if set free and expanded to the pressure of the atmosphere. The water which has held this gas absorbed may be now drawn away entirely from the separator by the branch pipe and cock I′, (shown in dotted lines,) and the engine is now ready to run. The pump E′ may now be left idle, and, in lieu of it, the pump J, about one-eighth the contents of the engine-cylinder, is employed and worked stroke for stroke with the engine. This pump has a pipe, J′, extending down from each of its inlet-valves into the gas-space of the cold-receiver, where their extremities are surrounded by a wooden cylinder of much larger diameter than themselves, and of height sufficient to reach from the bottom to the top, or nearly so, of the cold-receiver. These wooden cylinders K have an extensive opening in their sides, over which is extended some absorbing material, as cotton-wick, (shown in red vertical lines,) the ends of the wicks entering the water, which the wicks thus take up by capillary attraction and become saturated. Now, as the pump draws, the gas must pass to it through and between these wicks and becomes heavily laden with the gas-charged water in suspension, and so laden is forced by the pump on its return-stroke over through the pipe K′ and through a rose, L, in jets upon the flashing-coil. The gas is flashed off from the particles of water held in suspension, each particle being, as it were, effervesced and still more finely subdivided. This creates a great pressure in the separator, aided at the same time by the free gas, which formed the vehicle to this water, being at the same moment heated and expanded, the whole now passing to the engine to actuate its piston, which is meanwhile resisted by the far less pressure in the receiver; but as the pressure therein is the source of a pressure always proportionately greater in the separator, this back-pressure is indirectly only a greater gain. The exhaust passes to the cold-receiver and is absorbed, &c., as before, thus maintaining the same difference of pressure between the cold-receiver and separator as at the commencement.

I should have mentioned that when the engine is running in this method there will not generally be any deposit of water at the bottom of the separator, except when, the engine having been idle for some hours, the temperature of the separator-chamber falls below that temperature which did exist in the receiver when running—say 80° to 100° Fahrenheit—when the gas remaining in the separator will no longer be able to retain near the same amount of the water in suspension, and a deposit will take place, which should be drawn off before starting again by the cock and pipe z′ to the receiver. I have run an engine by this method also and found it to operate satisfactorily in all respects. As the gas expands in the cylinder it robs the particles of water of their heat, and to prevent this from going too far, so as to produce reabsorption to the detriment of the force of the engine, I surround its cylinder with a tight jacket, within which circulates water from the same source as that which heats the flashing-coil, and for the converse reason I have anticipated surrounding the pump J with cold water from the same source as that which keeps the receiver cool. While the gas is being compressed in the pump J a still further absorption takes place of the gas by the particles of water in suspension in it, and this makes the compression strikingly easy on the engine.

L′ is a cock for drawing off the gas-charged water from the receiver every few months, so that it may be filtered and so purified of the fine dirt that accumulates from wear, &c., as in every steam-engine.

I have anticipated (and have tried some promising experiments to this end) that by employing in the flashing-coil B′ steam of a moderate pressure, and therefore of a moderate fixed temperature, and superheating it to about 500° Fahrenheit, by which means nearly one-half of its total temperature would be "superheat," and very readily yielded, I can, when running an engine by the last-described method, convert the particles of water in suspension into steam, which, on expansion in the cylinder along with the gas, would produce that peculiar mechanical combination (as distinguished from chemical) or organization in the form of "vesicular" vapor or "cloud;" and, it being admitted that vesicular vapor for a given amount of caloric expended gives a greater expansion and power than ordinary artificial vapor, as steam, there would be gained this advantage in addition, in a sense, to that properly appertaining to the use of gas-charged water. Of course in such a case a true condenser (either a "surface" condenser or one with a "jet" of gas-charged water) would have to be employed, precisely as in the steam engine, except that no vacuum would exist. Whether the additional gain would pay for the greater trouble experience only can decide.

Having now fully described my invention, what I desire to secure by Letters Patent is as follows:

Operating an engine by the agency of water charged with a gas permanently aeriform at ordinary atmospheric temperatures and pressures, and over which water has a self-acting power of absorption, when the process consists in passing a given quantity of the gas, set free in charges, under pressure, by heat, through the engine, actuating its piston, and thence to a closed cool and wet vessel, while contemporaneously therewith I cause to pass to said vessel a sufficient quantity of the same water, which had just previously held the gas absorbed, to reabsorb it, both water and gas being cooled meanwhile, by means specially provided, to an extent sufficient to cause their recombination in their original form of gas-charged water, by all of which means the motive power of the gas is obtained without the necessity of converting the water into steam, while at the same time the gas is thereby reconcentrated and preserved for reuse without entailing an accumulation of water in the heating or separating vessel or an accumulating pressure of free gas in the cold-receiver, all as set forth.

WM. MT. STORM.

Witnesses:
HENRY P. LUNT,
JAS. W. HALE.